(12) United States Patent
Dhandapani et al.

(10) Patent No.: US 11,989,492 B2
(45) Date of Patent: May 21, 2024

(54) PRESTON MATRIX GENERATOR

(71) Applicant: Applied Materials, Inc., Santa Clara, CA (US)

(72) Inventors: Sivakumar Dhandapani, San Jose, CA (US); Thomas Li, Santa Clara, CA (US); Jun Qian, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 877 days.

(21) Appl. No.: 16/554,486

(22) Filed: Aug. 28, 2019

(65) Prior Publication Data

US 2020/0210547 A1 Jul. 2, 2020

Related U.S. Application Data

(60) Provisional application No. 62/785,165, filed on Dec. 26, 2018.

(51) Int. Cl.
  *B24B 49/10* (2006.01)
  *B24B 37/04* (2012.01)
  (Continued)

(52) U.S. Cl.
  CPC ............ *G06F 30/17* (2020.01); *B24B 37/042* (2013.01); *B24B 49/10* (2013.01); *G06F 30/333* (2020.01); *G06F 2115/10* (2020.01)

(58) Field of Classification Search
  CPC ..... G06F 30/17; G06F 30/333; B24B 37/042; B24B 49/10
  See application file for complete search history.

(56) References Cited

U.S. PATENT DOCUMENTS 6,111,634 A 8/2000 Pecen et al.
6,439,964 B1 8/2002 Prahbu et al.
(Continued)

FOREIGN PATENT DOCUMENTS

CN 1340210 3/2002
CN 1535196 10/2004
(Continued)

OTHER PUBLICATIONS

Frey et al. The Mechanism by Which Adaptive One-Factor-At-A-Time Experimentation Leads to Improvement Transactions of the ASME, vol. 128, Sep. 2006 (Year: 2006).*
(Continued)

*Primary Examiner* — Steven W Crabb
*Assistant Examiner* — Cuong V Luu
(74) *Attorney, Agent, or Firm* — Fish & Richardson P.C.

(57) ABSTRACT

A method of generating a matrix to relate a plurality of controllable parameters of a chemical mechanical polishing system to a polishing rate profile includes polishing a test substrate. The test substrate is polished for a first period of time using baseline parameter values with a first parameter set to a first value, and the test substrate is polished for a second period of time using first modified parameter values with the first parameter set to a modified second value. A thickness of the test substrate is monitored during polishing, and a baseline polishing rate profile is determined for the first period of time and a first modified polishing rate profile is determined for the second period of time. The matrix is calculated based on the baseline parameter values, the first modified parameters, the baseline polishing rate profile and the first modified polishing rate profile.

20 Claims, 2 Drawing Sheets

(51) Int. Cl.
*G06F 30/17* (2020.01)
*G06F 30/333* (2020.01)
*G06F 115/10* (2020.01)

(56) References Cited

U.S. PATENT DOCUMENTS

| | | |
|---|---|---|
| 6,540,591 B1 | 4/2003 | Pasadyn et al. |
| 6,544,103 B1 | 4/2003 | Korovin |
| 6,568,989 B1 | 5/2003 | Molnar |
| 6,932,671 B1 | 8/2005 | Korovin et al. |
| 7,001,243 B1 | 2/2006 | Yi et al. |
| 7,037,172 B1 | 5/2006 | Molnar et al. |
| 7,115,017 B1 | 10/2006 | Laursen et al. |
| 7,160,739 B2 | 1/2007 | Shanmugasundram et al. |
| 7,822,500 B2 | 10/2010 | Kobayashi et al. |
| 8,190,285 B2 | 5/2012 | Qian et al. |
| 8,246,417 B2 | 8/2012 | Kobayashi et al. |
| 8,396,582 B2 | 3/2013 | Kaushal et al. |
| 8,774,958 B2 | 7/2014 | Zhang et al. |
| 8,944,884 B2 | 2/2015 | David et al. |
| 9,213,340 B2 | 12/2015 | Zhang et al. |
| 9,390,986 B2 | 7/2016 | Kobayashi et al. |
| 9,490,186 B2 | 11/2016 | Benvegnu et al. |
| 2002/0193899 A1 | 12/2002 | Shanmugasundram et al. |
| 2004/0023606 A1 | 2/2004 | Wang et al. |
| 2005/0070205 A1 | 3/2005 | Korovin et al. |
| 2006/0009127 A1* | 1/2006 | Sakurai ............... B24B 37/005 451/41 |
| 2007/0102116 A1 | 5/2007 | Shanmugasundram et al. |
| 2007/0224915 A1 | 9/2007 | David et al. |
| 2008/0119119 A1 | 5/2008 | Zuniga et al. |
| 2010/0129939 A1 | 5/2010 | David et al. |
| 2010/0138026 A1 | 6/2010 | Kaushal et al. |
| 2012/0129431 A1 | 5/2012 | Hui et al. |
| 2012/0277897 A1* | 11/2012 | Zhang ............... G05B 19/182 700/103 |
| 2013/0237128 A1 | 9/2013 | David et al. |
| 2014/0273749 A1* | 9/2014 | Qian ............... B24B 35/005 451/5 |
| 2015/0147829 A1* | 5/2015 | Benvegnu ............ B24B 49/04 451/5 |
| 2015/0147940 A1* | 5/2015 | Benvegnu ............ B24B 49/12 451/5 |
| 2016/0096251 A1 | 4/2016 | Zhang et al. |
| 2019/0095797 A1 | 3/2019 | Dhandapani et al. |
| 2019/0096722 A1 | 3/2019 | Dhandapani et al. |

FOREIGN PATENT DOCUMENTS

| | | |
|---|---|---|
| CN | 1554118 | 12/2004 |
| CN | 1744285 | 3/2006 |
| CN | 102668043 | 9/2012 |
| CN | 105745743 | 7/2016 |
| JP | 2006-043873 | 2/2006 |
| JP | 2010-284792 | 12/2010 |
| JP | 2013-529386 | 7/2013 |
| JP | 2014-513434 | 5/2014 |
| JP | 2015-168015 | 9/2015 |
| JP | 2016-538728 | 12/2016 |
| KR | 10-2012-0123493 | 11/2012 |
| TW | 505555 | 10/2002 |
| TW | 200607604 | 3/2006 |
| TW | 200822204 | 5/2008 |
| TW | 201415003 | 4/2014 |
| WO | WO 01/32363 | 5/2001 |
| WO | WO 2008/032753 | 3/2008 |
| WO | WO 2015/171468 | 11/2015 |

OTHER PUBLICATIONS

Bae et al., "Effect of Retainer Pressure on Removal Profile and Stress Distribution in Oxide CMP", Nov. 19-21, 2009, International Conference on Planarization/CMP Technology, Fukuoka, 5 pages.
PCT International Search and Written Opinion in International Application No. PCT/US2019/067257, dated Apr. 21, 2020, 12 pages.
Office Action in Japanese Appln. No. 2021-536749, dated Aug. 16, 2022, 4 pages (with English translation).
Office Action in Chinese Appln. No. 201980012030.5, dated Mar. 25, 2023, 11 pages (with English translation).
Office Action in Taiwanese Appln. No. 108147306, dated Jul. 4, 2023, 20 pages (with English Search Report).
Office Action in Chinese Appln. No. 201980012030.5, dated Oct. 16, 2023, 17 pages (with English translation).

* cited by examiner

PRESTON MATRIX GENERATOR

CROSS-REFERENCE TO RELATED APPLICATIONS

This application claims priority to U.S. Application Ser. No. 62/785,165, filed on Dec. 26, 2018, the entire disclosure of which is incorporated by reference.

TECHNICAL FIELD

This invention relates to control systems for chemical mechanical polishing.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For some applications, the filler layer is planarized until the top surface of a patterned layer is exposed. For example, a conductive filler layer can be deposited on a patterned insulative layer to fill the trenches or holes in the insulative layer. After planarization, the portions of the conductive layer remaining between the raised pattern of the insulative layer form vias, plugs, and lines that provide conductive paths between thin film circuits on the substrate. For other applications, the filler layer is planarized until a predetermined thickness is left over an underlying layer. For example, a dielectric layer deposited can be planarized for photolithography.

Chemical mechanical polishing (CMP) is one accepted method of planarization. This planarization method typically requires that the substrate be mounted on a carrier head. The exposed surface of the substrate is typically placed against a rotating polishing pad with a durable roughened surface. The carrier head provides a controllable load on the substrate to push it against the polishing pad. A polishing liquid, such as a slurry with abrasive particles, is typically supplied to the surface of the polishing pad.

The processed substrate exhibits a material removal profile, a radial or two dimensional map of the change in a polished layer's thickness after the polishing process.

SUMMARY

A method of generating a matrix to relate a plurality of controllable parameters of a chemical mechanical polishing system to a polishing rate profile includes polishing a test substrate with a polishing pad in the chemical mechanical polishing system, and monitoring a thickness of the test substrate during polishing at each of a plurality of positions across the substrate using an in-situ monitoring system. While maintaining the substrate at the polishing pad, the test substrate is polished for a first period of time using baseline parameter values for the plurality of controllable parameters with a first parameter set to a first value, and the test substrate is polished for a second period of time using first modified parameter values for the plurality of controllable parameters with the first parameter set to a modified second value. A baseline polishing rate profile is determined for the first period of time and a first modified polishing rate profile is determined for the second period of time based on thickness measurements by the in-situ monitoring system. A matrix relating the plurality of controllable parameters to the polishing rate profile of the chemical mechanical polishing system is calculated based on the baseline parameter values, the first modified parameters, the baseline polishing rate profile and the first modified polishing rate profile.

Implementations may include one or more of the following features.

A target polishing profile may be received, and a value for each parameter of the plurality of controllable parameters may be determined to minimize a difference between the target removal profile and an expected removal profile calculated based on the matrix.

A device substrate may be polished at the chemical mechanical polishing system using the value for each parameter of the plurality of controllable parameters to minimize the difference.

The second value may be increased relative to the first value. Polishing the test substrate while maintaining the substrate at the polishing pad may include polishing the test substrate for a third period of time using second modified parameter values for the plurality of controllable parameters. The second modified parameters may include the first parameter set to a third value that is decreased relative to the first value.

A second modified polishing rate profile for the third period of time may be determined based on thickness measurements by the in-situ monitoring system, and calculating the matrix based on the baseline parameter values, the first modified parameters, the second modified parameters, the baseline polishing rate profile, the first modified polishing rate profile, and the second modified polishing rate profile.

The baseline parameter values may include a second parameter set to a fourth value. Polishing the test substrate while maintaining the substrate at the polishing pad may include polishing the test substrate for a fourth period of time using fourth modified parameter values for the plurality of controllable parameters. The fourth modified parameters may include the second parameter set to a fifth value different from the fourth value. The fourth modified parameters may include the first parameter set to the first value. The first modified parameters may include the second parameter set to a modified fifth value.

The plurality of controllable parameters may include pressures for a plurality of chambers in a carrier head that applies pressure to a plurality of zones on the substrate. The plurality of controllable parameters may include a pressure for a chamber in the carrier head that applies pressure to a retaining ring of the carrier head. The plurality of zones may be arranged concentrically and the plurality of positions are radial distances from the center of the substrate.

In other aspects, polishing systems and computer-program products tangibly embodied on a computer readable medium are provided to carry out these methods.

Advantages of implementations can optional include, but are not limited, to one or more of the following. The number of substrates needed to generate a Preston Matrix can be reduced. A stand-alone metrology tool is not required to generate the Preston Matrix. The generation of the Preston Matrix can be automated, reducing risk of user error.

The details of one or more embodiments of the invention are set forth in the accompanying drawings and the description below. Other features, objects, and advantages of the invention will be apparent from the description and drawings, and from the claims.

DETAILED DESCRIPTION

Multiple Pressure Control (MPC) is a technique described in U.S. Pat. No. 9,490,186, incorporated by reference, that offers closed loop optimization of substrate uniformity during polishing. The MPC software adjusts zone pressures in real time to offer superior within-wafer (WIW) uniformity performance. To make appropriate zone changes, the MPC software relies on a user-supplied Preston Matrix, which permits mathematically transformation between changes in zone pressures and changes in the removal profile. More formally, element $p_{i,j}$ of a Preston Matrix P maps a change in pressure zone j to a change in the removal rate of zone i. The use of a Preston Matrix is described in U.S. Pat. No. 8,774,958, incorporated by reference.

A procedure to determine the Preston Matrix for a given set of consumables is to perform a one-factor-at-a-time (OFAT) removal design of experiment (DOE). For example, for a 7 zone head, the DOE requires a minimum of 15 substrates. One substrate is used to measure the baseline removal profile, and two substrates are used to measure removal profile when the pressure of a single zone is varied up or down, respectively, from the baseline. An example DOE is described by Table 1.

TABLE 1

Current OFAT DOE for generating Preston Matrix

| Split | Zone 1 | Zone 2 | Zone 3 | Zone 4 | Zone 5 | Zone 6 | Zone 7 |
|---|---|---|---|---|---|---|---|
| 1 | Baseline | Baseline | Baseline | Baseline | Baseline | Baseline | Baseline |
| 2 | +30% | Baseline | Baseline | Baseline | Baseline | Baseline | Baseline |
| 3 | −30% | Baseline | Baseline | Baseline | Baseline | Baseline | Baseline |
| 4 | Baseline | +30% | Baseline | Baseline | Baseline | Baseline | Baseline |
| 5 | Baseline | −30% | Baseline | Baseline | Baseline | Baseline | Baseline |
| 6 | Baseline | Baseline | +30% | Baseline | Baseline | Baseline | Baseline |
| 7 | Baseline | Baseline | −30% | Baseline | Baseline | Baseline | Baseline |
| 8 | Baseline | Baseline | Baseline | +30% | Baseline | Baseline | Baseline |
| 9 | Baseline | Baseline | Baseline | −30% | Baseline | Baseline | Baseline |
| 10 | Baseline | Baseline | Baseline | Baseline | +30% | Baseline | Baseline |
| 11 | Baseline | Baseline | Baseline | Baseline | −30% | Baseline | Baseline |
| 12 | Baseline | Baseline | Baseline | Baseline | Baseline | +30% | Baseline |
| 13 | Baseline | Baseline | Baseline | Baseline | Baseline | −30% | Baseline |
| 14 | Baseline | Baseline | Baseline | Baseline | Baseline | Baseline | +30% |
| 15 | Baseline | Baseline | Baseline | Baseline | Baseline | Baseline | −30% |

Such a method of generating the Preston matrix has three main inconveniences. First, the removal rate calculation uses pre and post thickness measurements, which requires access to a stand-alone metrology tool that permits a sufficiently high measurement density, which may not be readily available at a customer site. Second, the calculations require an engineer to get access to the metrology data and process it, e.g., through an excel spreadsheet, leaving room for delays with data transfer and human error. Third, the procedure requires a significant number of substrates (15 in the example described above) which can be difficult to acquire at customer sites.

The need for additional metrology tools, recipes, or data can be reduced or eliminated by automating the computation of the Preston Matrix directly from the spectral data acquired by an in-situ monitoring system. Additionally, the number of substrates required to determine the Preston Matrix can be reduced. Together, these factors provide significant improvement to the ease of use of the MPC technique.

Figure 1:
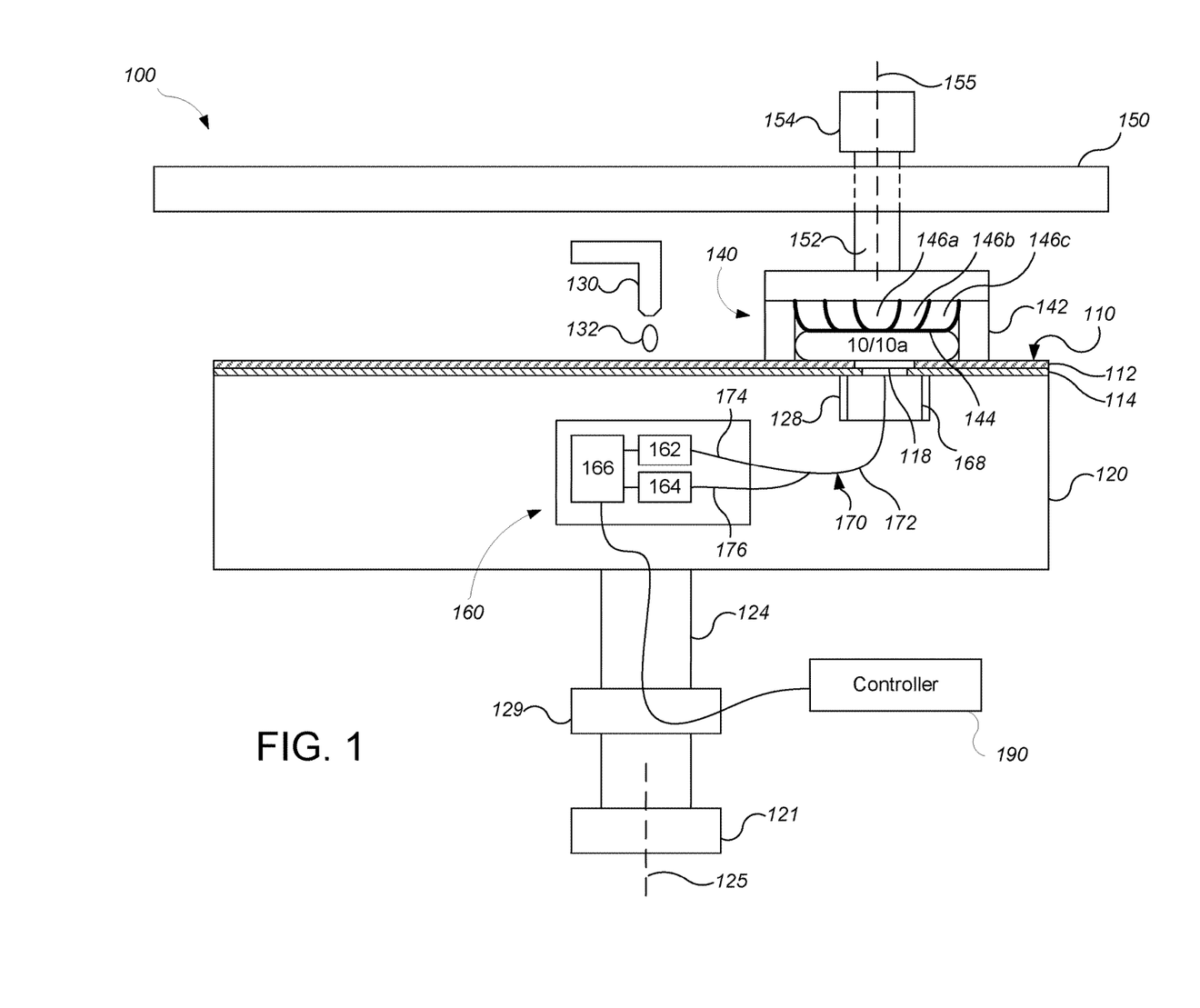
FIG. 1 shows a schematic cross-sectional view of an example chemical mechanical polishing apparatus.

FIG. 1 illustrates an example of a polishing apparatus 100. The polishing apparatus 100 includes a rotatable disk-shaped platen 120 on which a polishing pad 110 is situated. The platen is operable to rotate about an axis 125. For example, a motor 121 can turn a drive shaft 124 to rotate the platen 120. The polishing pad 110 can be detachably secured to the platen 120, for example, by a layer of adhesive. The polishing pad 110 can be a two-layer polishing pad with an outer polishing layer 112 and a softer backing layer 114.

The polishing apparatus 100 can include a combined slurry/rinse arm 130. During polishing, the arm 130 is operable to dispense a polishing liquid 132, such as a slurry, onto the polishing pad 110. While only one slurry/rinse arm 130 is shown, additional nozzles, such as one or more dedicated slurry arms per carrier head, can be used. The polishing apparatus can also include a polishing pad conditioner to abrade the polishing pad 110 to maintain the polishing pad 110 in a consistent abrasive state.

Figure 2:
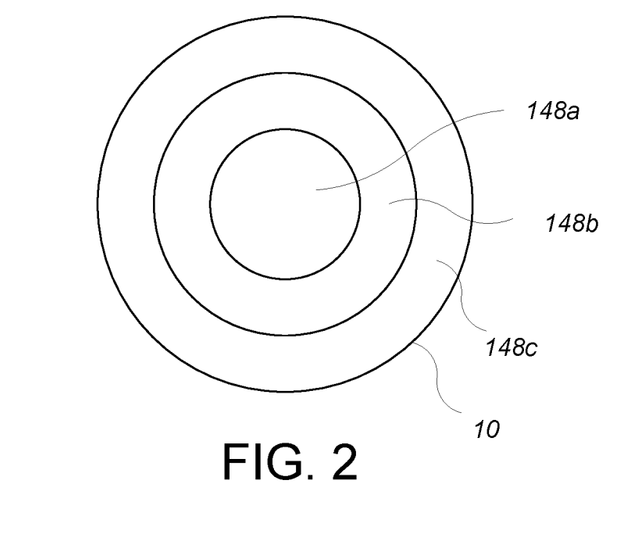
FIG. 2 shows a schematic top view of a substrate having multiple zones.

The polishing apparatus 100 can further include a carrier head 140. The carrier head 140 can include a retaining ring 142 to retain the substrate 10 below a flexible membrane 144. The carrier head 140 may also include a plurality of independently controllable pressurizable chambers defined by the membrane, e.g., 3 chambers 146a-146c, which can apply independently controlled amounts of pressure to associated zones 148a-148c on the flexible membrane 144, and thus on the back side of the substrate 10 (see FIG. 2). The flexible membrane 144 can be formed of an elastic material, such as a high strength silicone rubber. Referring to FIG. 2, the center zone 148a can be substantially circular, and the remaining zones 148b-148c can be concentric annular zones around the center zone 148a. Although only three chambers are illustrated in FIGS. 1 and 2 for ease of illustration, there could be two chambers, or four or more chambers, e.g., five chambers.

Returning to FIG. 1, the carrier head 140 is suspended from a support structure 150, e.g., a carousel or track, and is connected by a drive shaft 152 to a carrier head rotation motor 154 so that the carrier head can rotate about an axis 155. Optionally, carrier head 140 can oscillate laterally, e.g., on sliders on the carousel 150, by motion along the track; or by rotational oscillation of the carousel itself. In operation, the platen is rotated about its central axis 125, and the carrier head is rotated about its central axis 155 and translated laterally across the top surface of the polishing pad.

The polishing apparatus also includes an in-situ monitoring system 160, the data from which can be used by a controller 190 to determine whether to adjust a polishing rate or an adjustment for the polishing rate. The controller 190 can also be used calculate a Preston Matrix as discussed below.

The in-situ monitoring system 160 can include an optical monitoring system, e.g., a spectrographic monitoring system. An optical access through the polishing pad is provided by including an aperture (i.e., a hole that runs through the pad) or a solid window 118. The solid window 118 can be secured to the polishing pad 110, e.g., as a plug that fills an aperture in the polishing pad, e.g., is molded to or adhesively secured to the polishing pad, although in some implementations the solid window can be supported on the platen 120 and project into an aperture in the polishing pad.

The optical monitoring system 160 can include a light source 162, a light detector 164, and circuitry 166 for sending and receiving signals between a remote controller 190, e.g., a computer, and the light source 162 and light detector 164. One or more optical fibers can be used to transmit the light from the light source 162 to the optical access in the polishing pad, and to transmit light reflected from the substrate 10 to the detector 164. For example, a bifurcated optical fiber 170 can be used to transmit the light from the light source 162 to the substrate 10 and back to the detector 164. The bifurcated optical fiber an include a trunk 172 positioned in proximity to the optical access, and two branches 174 and 176 connected to the light source 162 and detector 164, respectively.

In some implementations, the top surface of the platen can include a recess 128 into which is fit an optical head 168 that holds one end of the trunk 172 of the bifurcated fiber. The optical head 168 can include a mechanism to adjust the vertical distance between the top of the trunk 172 and the solid window 118.

The output of the circuitry 166 can be a digital electronic signal that passes through a rotary coupler 129, e.g., a slip ring, in the drive shaft 124 to the controller 190 for the optical monitoring system. Similarly, the light source can be turned on or off in response to control commands in digital electronic signals that pass from the controller 190 through the rotary coupler 129 to the optical monitoring system 160. Alternatively, the circuitry 166 could communicate with the controller 190 by a wireless signal.

The light source 162 can be operable to emit white light. In one implementation, the white light emitted includes light having wavelengths of 200-800 nanometers. A suitable light source is a xenon lamp or a xenon mercury lamp.

The light detector 164 can be a spectrometer. A spectrometer is an optical instrument for measuring intensity of light over a portion of the electromagnetic spectrum. A suitable spectrometer is a grating spectrometer. Typical output for a spectrometer is the intensity of the light as a function of wavelength (or frequency).

As noted above, the light source 162 and light detector 164 can be connected to a computing device, e.g., the controller 190, operable to control their operation and receive their signals. The computing device can include a microprocessor situated near the polishing apparatus, e.g., a programmable computer. With respect to control, the computing device can, for example, synchronize activation of the light source with the rotation of the platen 120. The controller 190 can also generate a target pressure profile based on the data from the optical monitoring system 160, store the target pressure profile, and calculate a set of pressures for the chambers in the carrier head to achieve the target pressure profile.

In some implementations, the light source 162 and detector 164 of the in-situ monitoring system 160 are installed in and rotate with the platen 120. In this case, the motion of the platen will cause the sensor to scan across each substrate. In particular, as the platen 120 rotates, the controller 190 can cause the light source 162 to emit a series of flashes starting just before and ending just after each substrate 10 passes over the optical access. Alternatively, the computing device can cause the light source 162 to emit light continuously starting just before and ending just after each substrate 10 passes over the optical access. In either case, the signal from the detector can be integrated over a sampling period to generate spectra measurements at a sampling frequency.

In operation, the controller 190 can receive, for example, a signal that carries information describing a spectrum of the light received by the light detector for a particular flash of the light source or time frame of the detector. Thus, this spectrum is a spectrum measured in-situ during polishing.

Figure 3:
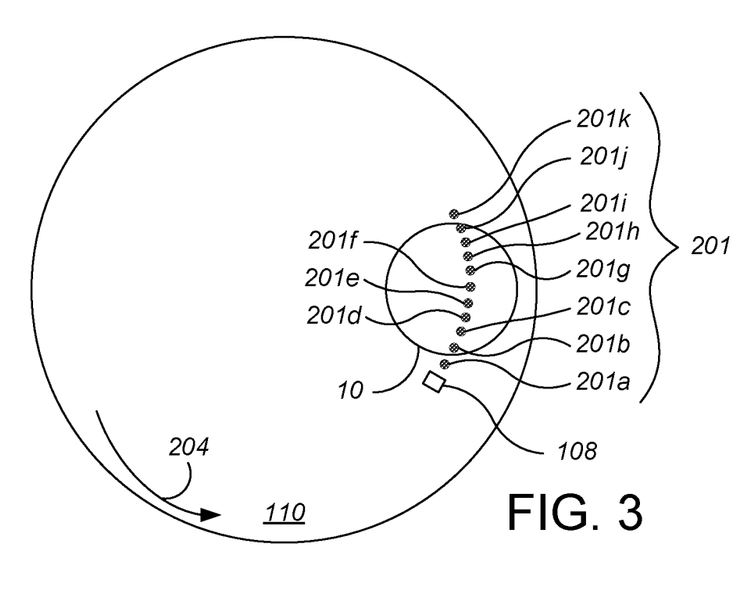
FIG. 3 shows a top view of a polishing pad and shows locations where in-situ measurements can be taken on a substrate.

As shown by in FIG. 3, if the detector is installed in the platen, due to the rotation of the platen (shown by arrow 204), as the window 108 travels below one carrier head (e.g., the carrier head holding the first substrate 10a), the optical monitoring system making spectra measurements at a sampling frequency will cause the spectra measurements to be taken at locations 201 in an arc that traverses the first substrate 10a. For example, each of points 201a-201k represents a location of a spectrum measurement by the monitoring system of the first substrate 10a (the number of points is illustrative; more or fewer measurements can be taken than illustrated, depending on the sampling frequency). As shown, over one rotation of the platen, spectra are obtained from different radii on the substrate 10a. That is, some spectra are obtained from locations closer to the center of the substrate 10a and some are closer to the edge.

Spectral data from the in-situ monitoring system 160 can used by the controller 190 to calculate film thickness, e.g., as described in U.S. Pat. No. 8,944,884, incorporated by reference. In particular, the film thickness values can be calculated for a test substrate, thus eliminating the need for metrology tools. Moreover, the spectral data is collected from the in-situ monitoring system 160 can be used to calculate instantaneous removal rates. In contrast, offline metrology can only be used to calculate average removal rate over the entire polish.

In addition, due to the temporal resolution, multiple DOE splits can be performed within a single substrate polish. For example, in polishing of a test substrate, the substrate can be polished using baseline parameters for a set time period that is less than the total polishing time, e.g., 30-60 seconds, while spectral data is obtained. Thereafter, the substrate can be continue to polished with modified parameters; once each with the pressure of a single zone varied up, e.g., by 10-50%, and down, e.g., by 10-50%, respectively. The polishing time for polishing with each modified parameter can be the same as the baseline parameters, e.g., 30-60 seconds, although this is not required. The process of measuring for an increased and decreased chamber pressure can be repeated for each chamber to obtain respective profiles for each chamber when the pressure of that chamber is varied up or down. Since multiple DOE can be performed using a single substrate, the number of substrates needed is reduced.

To further reduce the number of substrates required for the Preston Matrix, a more efficient experimental design can be used. For example, a Plackett-Burman design was tested. The Plackett-Burman design varies multiples zones between splits and structures the experiment such that each zone should be increased the same number of times it is decreased. Using this approach, the number of splits necessary to generate a Preston Matrix can be reduced from 15 to 8.

A minimalist design was also tested by assuming that each zone is approximately independent from the other zones. With such an assumption, all zones can be varied from split to split. While the underlying assumption is not strictly true, preliminary testing shows that it may be good enough. This method reduces the number of required splits to 5.

To verify that spectral data acquired by in-situ monitoring system can be used in place of pre/post metrology, the BKM OFAT DOE (with 15 splits using 15 wafers) was run and measurements were collected both in-situ using a FullVision spectral monitoring system and pre/post polishing with a Nanometrics tool. The Preston matrix calculated from the Nano metrology data (FIG. 2) can be compared with the one calculated using only the FullVision data (FIG. 3).

TABLE 2

Preston Matrix generated with OFAT DOE (15 wafers/15 splits) and Pre/Post metrology (current BKM)

|    | Z1      | Z2      | Z3      | Z4      | Z5     | Z6      | Z7      |
|----|---------|---------|---------|---------|--------|---------|---------|
| Z1 | 0.5393  | 0.0659  | 0.0814  | 0.0818  | 0.0640 | 0.0090  | −0.0350 |
| Z2 | 0.3582  | 0.0704  | 0.3150  | 0.0878  | 0.0340 | −0.0049 | −0.0383 |
| Z3 | 0.0797  | 0.0210  | 0.5470  | 0.1977  | 0.0109 | −0.0023 | −0.0387 |
| Z4 | −0.0250 | −0.0404 | 0.0489  | 0.8688  | 0.0338 | 0.0064  | −0.0396 |
| Z5 | −0.0217 | −0.0304 | −0.0427 | 0.2054  | 0.7002 | 0.0815  | −0.0431 |
| Z6 | −0.0044 | −0.0122 | −0.0236 | 0.0575  | 0.1393 | 0.7890  | 0.0189  |
| Z7 | −0.0031 | −0.0187 | −0.0508 | 0.0402  | 0.0069 | 0.1030  | 0.8338  |

TABLE 3

Preston matrix generated with OFAT DOE (15 wafers/15 splits) and FullVision Data

|    | Z1        | Z2       | Z3       | Z4       | Z5       | Z6       | Z7       |
|----|-----------|----------|----------|----------|----------|----------|----------|
| Z1 | 0.449365  | −0.04267 | 0.220317 | −0.03418 | 0.036521 | 0.027714 | −0.01778 |
| Z2 | 0.289801  | −0.01452 | 0.365929 | −0.00478 | 0.01435  | −0.01344 | −0.10496 |
| Z3 | −0.00419  | −0.04539 | 0.538714 | 0.05045  | −0.00775 | −0.08207 | −0.05869 |
| Z4 | −0.10196  | −0.05422 | 0.004842 | 0.648181 | −0.027   | −0.06943 | −0.0591  |
| Z5 | −1.13E−01 | −0.04208 | −0.06094 | 0.066282 | 0.618526 | 0.044013 | −0.00801 |
| Z6 | −0.09107  | −0.03254 | −0.0362  | −0.03513 | 0.039656 | 0.798043 | −0.017   |
| Z7 | −0.05967  | 0.001173 | −0.01115 | 0.036551 | −0.00128 | 0.081973 | 0.863974 |

The results are sufficiently similar that this more efficient DOE should be able to be used with a reasonable expectation of success.

Subsequently, the Plackett-Burman design (with 8 splits using 2 wafers) was tested and a matrix (Table 4) was calculated from the FullVision data.

TABLE 4

Preston matrix generated with Plackett-Burman DOE (2 wafers/8 splits) and FullVision Data

|    | Z1       | Z2       | Z3       | Z4       | Z5       | Z6       | Z7       |
|----|----------|----------|----------|----------|----------|----------|----------|
| Z1 | 0.525685 | −0.1261  | 0.069411 | 0.218269 | −0.08648 | 0.071816 | 0.166365 |
| Z2 | 0.413652 | −0.09812 | 0.28331  | 0.119507 | −0.19096 | 0.094422 | 0.106961 |
| Z3 | 0.159355 | −0.29542 | 0.368101 | 0.24345  | −0.25218 | 0.108152 | 0.122235 |
| Z4 | 0.144175 | −0.44057 | −0.27719 | 0.863427 | −0.34472 | 0.127445 | 0.091991 |
| Z5 | 2.25E−01 | −0.48622 | −0.382   | 0.264769 | 0.337646 | 0.220788 | 0.078452 |
| Z6 | 0.182474 | −0.51689 | −0.44072 | 0.081925 | −0.33761 | 0.969335 | 0.106067 |
| Z7 | 0.313165 | −0.40773 | −0.37713 | 0.170429 | −0.31202 | 0.244666 | 1.101519 |

Again the results are in the same ballpark as the Preston Matrix shown in Table 2. The results are sufficiently similar that this more efficient DOE should be able to be used with a reasonable expectation of success.

To explore whether the assumption of zone independence would work for MPC, an active MPC was tested using the identity matrix as the Preston Matrix. The zone thicknesses converged, indicating that the identity matrix was good enough in this particular case to improve the WIW uniformity. However if the Preston Matrix was scaled by 0.3, the zones did not converge, suggesting that while off diagonal terms may not be important, but the main diagonal terms are important.

With the assumption of zone independence, a minimalist DOE was run and a Preston matrix was calculated using only 5 splits, all run in a single continuous polish on a single wafer. The resulting matrix (Table 5) has slightly larger main diagonal values compared to the BKM Preston matrix.

TABLE 5

Preston matrix generated with minimalist DOE (1 wafer/5 splits) and FullVision Data

|    | Z1  | Z2   | Z3 | Z4 | Z5 | Z6 | Z7 |
|----|-----|------|----|----|----|----|----|
| Z1 | 0.8 | 0    | 0  | 0  | 0  | 0  | 0  |
| Z2 | 0   | 0.37 | 0  | 0  | 0  | 0  | 0  |

TABLE 5-continued

Preston matrix generated with minimalist DOE
(1 wafer/5 splits) and FullVision Data

|    | Z1 | Z2 | Z3   | Z4   | Z5 | Z6   | Z7   |
|----|----|----|------|------|----|------|------|
| Z3 | 0  | 0  | 0.93 | 0    | 0  | 0    | 0    |
| Z4 | 0  | 0  | 0    | 1.25 | 0  | 0    | 0    |
| Z5 | 0  | 0  | 0    | 0    | 1  | 0    | 0    |
| Z6 | 0  | 0  | 0    | 0    | 0  | 1.35 | 0    |
| Z7 | 0  | 0  | 0    | 0    | 0  | 0    | 1.44 |

By switching to in-situ measurements and using more efficient DOEs, the need for third party metrology and data can be eliminated, and the number of substrates needed can be reduced from 15 to as low as just 1. Thus, using the methods described above can improve the ease and speed of generating the Preston Matrix and therefore the ease and simplicity of using MPC.

The functional operations described in this specification as provided by the controller 190 can be implemented in digital electronic circuitry, or in computer software, firmware, or hardware, including the structural means disclosed in this specification and structural equivalents thereof, or in combinations of them. The functional operations can be implemented as one or more computer program products, i.e., one or more computer programs tangibly embodied in an information carrier, e.g., in a machine-readable non-transitory storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

The techniques are applicable to different types of substrates, e.g., blanket and patterned wafers.

A number of embodiments of the invention have been described. Nevertheless, it will be understood that various modifications may be made without departing from the spirit and scope of the invention. Accordingly, other embodiments are within the scope of the following claims.

What is claimed is:

1. A method of generating a matrix to relate a plurality of controllable parameters of a chemical mechanical polishing system to a-polishing rate profile, the method comprising:
performing a one-factor-at-a time (OFAT) removal experimentation, where a total number of one or more test substrates used in the OFAT removal experimentation is less than a total number of the plurality of controllable parameters and, for at least one test substrate of the one or more test substrates, the test substrate is used for a plurality of experiments in the OFAT removal experimentation, each experiment in plurality of experiments defined by predetermined periods of time and predetermined values set prior to polishing a test substrate for the experiment, wherein performing the OFAT experimentation includes
polishing the test substrate of the one or more test substrates with a polishing pad in the chemical mechanical polishing system, including while maintaining the test substrate at the polishing pad,
for a first experiment of the plurality of experiments, polishing the test substrate for a first predetermined period of time using baseline parameter values of the OFAT removal experimentation for the plurality of controllable parameters, wherein the baseline parameter values include a first parameter set to a first predetermined value, and
for a second experiment of the plurality of experiments, polishing the test substrate for a second predetermined period of time using first modified parameter values of the OFAT removal experimentation for the plurality of controllable parameters, wherein the first modified parameters include the first parameter set to a modified, second predetermined value,
monitoring a thickness of the test substrate during polishing at each of a plurality of positions across the test substrate using an in-situ monitoring system, and
determining a baseline polishing rate profile for the first predetermined period of time and a first modified polishing rate profile for the second predetermined period of time based on thickness measurements by the in-situ monitoring system; and
generating a matrix relating the plurality of controllable parameters to the polishing rate profile of the chemical mechanical polishing system by calculating the matrix using the baseline parameter values, the first modified parameters, the baseline polishing rate profile and the first modified polishing rate profile.

2. The method of claim 1, comprising receiving a target removal profile, and determining a value for each parameter of the plurality of controllable parameters to minimize a difference between the target removal profile and an expected removal profile calculated based on the matrix.

3. The method of claim 2, comprising polishing a device substrate at the chemical mechanical polishing system using the value for each parameter of the plurality of controllable parameters to minimize the difference.

4. The method of claim 1, wherein the modified second predetermined value is increased relative to the first predetermined value, and wherein polishing the test substrate while maintaining the test substrate at the polishing pad includes polishing the test substrate for a third predetermined period of time using second modified parameters values for the plurality of controllable parameters, wherein the second modified parameter values include the first parameter set to a third predetermined value that is decreased relative to the first predetermined value.

5. The method of claim 4, comprising determining a second modified polishing rate profile for the third predetermined period of time based on thickness measurements by the in-situ monitoring system, and calculating the matrix based on the baseline parameter values, the first modified parameter values, the second modified parameter values, the baseline polishing rate profile, the first modified polishing rate profile, and the second modified polishing rate profile.

6. The method of claim 1, wherein the baseline parameter values include a second parameter set to a fourth value.

7. The method of claim 6, wherein polishing the test substrate while maintaining the test substrate at the polishing pad includes polishing the test substrate for a fourth predetermined period of time using fourth modified parameter values for the plurality of controllable parameters, wherein the fourth modified parameter values include the second parameter set to a fifth value different from the fourth value.

8. The method of claim 7, wherein the fourth modified parameter values include the first parameter set to the first predetermined value.

9. The method of claim 6, wherein the first modified parameter values include the second parameter set to a modified fifth value.

10. The method of claim 1, wherein the plurality of controllable parameters include pressures for a plurality of chambers in a carrier head that applies pressure to a plurality of zones on the test substrate.

11. The method of claim 10, wherein the plurality of controllable parameters include a pressure for a chamber in the carrier head that applies pressure to a retaining ring of the carrier head.

12. The method of claim 10, wherein the plurality of zones are arranged concentrically and the plurality of positions are radial distances from the center of the test substrate.

13. The method of claim 1, wherein the in-situ monitoring system comprises a spectrographic monitoring system.

14. A computer program product encoded on a non-transitory computer storage medium and including instructions to cause a processor to:
cause a chemical mechanical polishing system to polish a test substrate in a one-factor-at a time (OFAT) removal experimentation, wherein a total number of one or more test substrates used in the OFAT removal experimentation is less than a total number of a plurality of controllable parameters and, for at least one test substrate of the one or more test substrates, the at least one test substrate is used for a plurality of experiments in the OFAT experimentation, each experiment in plurality of experiments defined by predetermined periods of time and predetermined values set prior to polishing a test substrate of the one or more test substrates for the experiment, wherein performing the OFAT experimentation includes, including
for a first experiment of the plurality of experiments, polishing the test substrate for a first predetermined period of time using baseline parameter values for a plurality of controllable parameters, wherein the baseline parameter values include a first parameter set to a first predetermined value, and
for second first experiment of the plurality of experiments, polishing the test substrate for a second predetermined period of time using first modified parameter values for the plurality of controllable parameters, wherein the first modified parameter values include the first parameter set to a modified, second predetermined value;
receive from an in-situ monitoring system measurements of a thickness of the test substrate during polishing at each of a plurality of positions across the test substrate;

determine a baseline polishing rate profile for the first predetermined period of time and a first modified polishing rate profile for the second predetermined period of time based on thickness measurements by the in-situ monitoring system; and
generate a matrix relating the plurality of controllable parameters to the polishing rate profile of the chemical mechanical polishing system by calculating the matrix using the baseline parameter values, the first modified parameter values, the baseline polishing rate profile and the first modified polishing rate profile.

15. The computer program product of claim 14, comprising instructions to receive a target removal profile, and to determine a value for each parameter of the plurality of controllable parameters to minimize a difference between the target removal profile and an expected removal profile calculated based on the matrix.

16. The computer program product of claim 14, wherein the plurality of controllable parameters include pressures for a plurality of chambers in a carrier head that applies pressure to a plurality of zones on the test substrate.

17. The computer program product of claim 16, wherein the plurality of controllable parameters include a pressure for a chamber in the carrier head that applies pressure to a retaining ring of the carrier head.

18. A polishing system, comprising: a rotatable platen to support a polishing pad;
carrier head to hold a substrate in contact with a polishing surface of the polishing pad, the carrier head having a plurality of controllable zones;
an in-situ monitoring system configured to make a series of thickness measurements of the substrate during polishing at each of a plurality of positions across the substrate; and
a controller configured to
cause the polishing system to polish a test substrate of one or more test substrates in a one-factor-at a time (OFAT) removal experimentation, wherein a total number of one or more test substrates used in the OFAT removal experimentation is less than a total number of a plurality of controllable parameters and, for at least one test substrate of the one or more test substrates, the at least one test substrate is used for a plurality of experiments in the OFAT experimentation, each experiment in plurality of experiments defined by predetermined periods of time and predetermined values set prior to polishing a test substrate of the one or more test substrates for the experiment, wherein performing the OFAT experimentation includes
for a first experiment of the plurality of experiments, polishing the test substrate for a first predetermined period of time using baseline parameter values of the OFAT experimentation for a plurality of controllable parameters, wherein the baseline parameter values include a first parameter set to a first predetermined value, and
for a second experiment of the plurality of experiments, polishing the test substrate for a second predetermined period of time using first modified parameter values of the OFAT experimentation for the plurality of controllable parameters, wherein the first modified parameter values include the first parameter set to a modified, second predetermined value;

receive from an in-situ monitoring system measurements of a thickness of the test substrate during polishing at each of a plurality of positions across the test substrate;

determine a baseline polishing rate profile for the first predetermined period of time and a first modified polishing rate profile for the second predetermined period of time based on thickness measurements by the in-situ monitoring system; and generate a matrix relating the plurality of controllable parameters to the polishing rate profile of the polishing system by calculating the matrix using the baseline parameter values, the first modified parameter values, the baseline polishing rate profile and the first modified polishing rate profile.

19. The system of claim 18, wherein the controller is configured to receive a target removal profile, and to determine a value for each parameter of the plurality of controllable parameters to minimize a difference between the target removal profile and an expected removal profile calculated based on the matrix.

20. The system of claim 18, wherein the in-situ monitoring system comprises a spectrographic monitoring system.

\* \* \* \* \*

UNITED STATES PATENT AND TRADEMARK OFFICE
CERTIFICATE OF CORRECTION

PATENT NO. : 11,989,492 B2
APPLICATION NO. : 16/554486
DATED : May 21, 2024
INVENTOR(S) : Sivakumar Dhandapani, Thomas Li and Jun Qian It is certified that error appears in the above-identified patent and that said Letters Patent is hereby corrected as shown below:

In the Claims

In Column 9, Line 67, Claim 1, delete "a-" and insert -- a --.

In Column 10, Line 55, Claim 4, delete "modified" and insert -- modified, --.

In Column 11, Line 51, Claim 14, after "includes," delete "including".

In Column 12, Line 5, Claim 14, delete "in- situ" and insert -- in-situ --.

Signed and Sealed this
Twentieth Day of August, 2024

Katherine Kelly Vidal
*Director of the United States Patent and Trademark Office*